United States Patent [19]

De Vries

[11] Patent Number: 4,865,726

[45] Date of Patent: Sep. 12, 1989

[54] DEVICE FOR MAKING POTABLE WATER

[75] Inventor: Isse De Vries, Händelhof, Netherlands

[73] Assignee: Promac B.V., Zaltbommel, Netherlands

[21] Appl. No.: 136,297

[22] Filed: Dec. 22, 1987

[51] Int. Cl.⁴ ............................................. B01D 13/00
[52] U.S. Cl. ................................. 210/137; 210/195.2; 210/259; 210/321.65; 210/321.69
[58] Field of Search ................. 210/641, 636, 741, 90, 210/137, 195.2, 321.65, 321.69, 418, 259, 321.89

[56] References Cited

U.S. PATENT DOCUMENTS

| | | | |
|---|---|---|---|
| 3,441,136 | 4/1969 | Serpass et al. | 210/90 |
| 3,506,126 | 4/1970 | Serpass et al. | 210/195.2 |
| 3,795,609 | 3/1974 | Hill et al. | 210/636 |
| 3,977,967 | 8/1976 | Trulson et al. | 210/639 |
| 4,190,537 | 2/1980 | Tondreau et al. | 210/321.65 |
| 4,191,182 | 3/1980 | Popovich et al. | 210/195.2 |
| 4,427,552 | 1/1984 | Lieberherr et al. | 210/741 |
| 4,610,790 | 9/1986 | Reti et al. | 210/259 |
| 4,680,109 | 7/1987 | Yamada et al. | 210/137 |
| 4,772,385 | 9/1988 | Yamada | 210/137 |

FOREIGN PATENT DOCUMENTS 7901121 12/1979 PCT Int'l Appl. .

OTHER PUBLICATIONS de Vries, I. "The Development of a Mobile Drinking Water Plant for Military use", from Innovatie, v14, No. 62, Dec. 1984, pp. 6–8.

Primary Examiner—Richard V. Fisher
Assistant Examiner—Christopher Upton
Attorney, Agent, or Firm—Rosen, Dainow & Jacobs

[57] ABSTRACT

Device for making potable water out of water contaminated by a.o. chemical, biological and nuclear pollutants, as well as by pathogenic bacteria, viruses and normal solid particles, said device being provided by a perforated plate filter, connected to a finer filter in turn coupled to an ultrafilter directly followed by a hyperfilter without interposition of a buffertank and an activated carbon filter, a control device being provided at the ultrafilter's entrance controlled by a pressure switch at the ultrafilter's exit. The control device keeps the pressure at the exit of the ultrafilter approximately constant.

6 Claims, 1 Drawing Sheet

DEVICE FOR MAKING POTABLE WATER

BACKGROUND OF THE INVENTION

The invention relates to a device for making potable water out of water contaminated by a.o. chemical, biological and nuclear pollutants, as well as by pathogenic bacteria, viruses, and normal solid particles. The provided by a perforated plate filter for filtering out the coarse pollutants. The plate filter is connected to a finer filter, for retaining the finer particles. The latter is in turn coupled to an ultrafilter, for removing the remainder of the undissolved materials, including colloids, bacteria and viruses. This is in turn followed by a hyperfilter through which the water is forced against the osmotic pressure and in which the greater part of the dissolved materials, like heavy metals, phenolics, haloforms, pesticides and radioactive compounds, stays behind. This is in turn, followed by an activated carbon filter for removing the remainder of any highly toxic chemicals.

Such a device is known from "Innovatie", Volume 14, No. 62, Dec. 1984.

For these devices it is required that the output of potable water remain constant for a long period. Owing to contamination of the ultrafilter, the output will slowly decrease, which drawback can be overcome by installing a buffertank. However, a buffertank between the ultrafilter and the hyperfilter (called reverse osmosis filter as well), considerably increases the volume of the device which mostly has to be transportable, whereas moreover the danger exists of a renewed infection by bacteria and viruses, which of course is undesirable.

SUMMARY OF THE INVENTION

According to the characteristic feature of the invention, this objection is avoided in that the ultrafilter and the hyperfilter are directly coupled without interposition of a buffertank and a control device is provided at the entrance of the ultrafilter, controlled by a pressure switch at the ultrafilter's exit, said control device keeping the pressure at the exit of the ultrafilter approximately constant.

According to another characteristic feature of the invention, the control device consists of a motor regulated valve, said motor being switched on by the pressure switch, upon the pressure at the exit of the ultrafilter reaching the lowest level desired and further opening the valve until the pressure switch switches off the motor again.

Herewith it is obtained, that if the pressure at the exit of the ultrafilter, owing to its increasing contamination, becomes too low, the pressure switch switches on the motor, thus further opening the valve, so that the pressure at the entrance of the filter and as a consequence at its exit too increases and as a result the output of the filter. By the increase of the pressure at the exit the pressure switch opens again, so that the motor stops and the valve remains in its new position until the pressure at the exit, owing to further contamination of the ultrafilter, becomes too low again and the process is repeated.

With an ultrafilter consisting of one or more parallel arranged tubes provided with holes in their wall, against the inner side of which the membrane is fixed, around each of the tubes an outer tube being provided in which the permeate is corrected, according to a further characteristic feature of the invention a pump is provided, feeding back part of the concentrate to the entrance of the filter at such a high speed, that the flow is turbulent.

Herewith is is obtained that the contamination can hardly stick to the membrane and cleaning of the filter is needed at greater intervals.

SUMMARY OF DRAWINGS

The features mentioned above will be explained more fully with reference to the following description in which.

DETAILED DESCRIPTION OF PREFERRED EMBODIMENT

Figure 1:
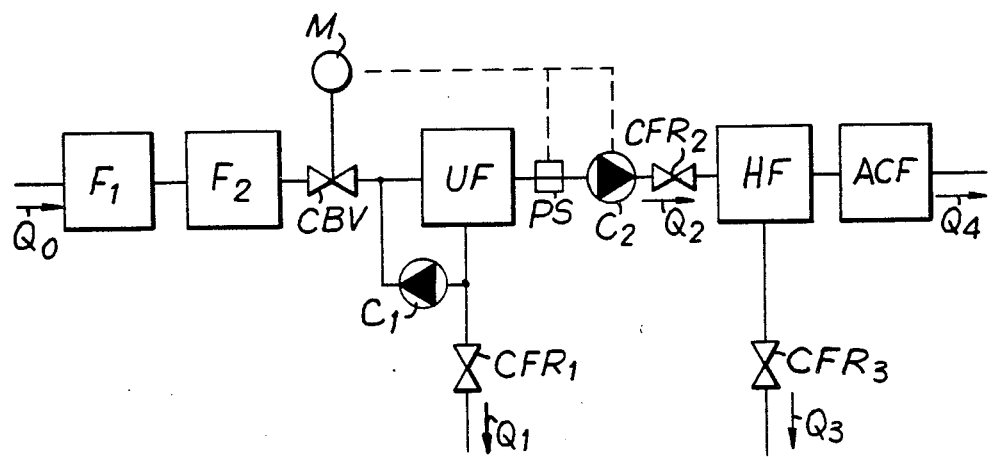
FIG.1 represents a diagram of an example of a device according to the invention.

In FIG. 1 the water to be purified is supplied to a filter F1, here consisting of a grid with openings of ±1½ millimeter and retaining the coarse particles.

The exit of the filter F1 is connected to the entrance of a self-cleaning filter F2, passing only particles smaller than 90 micrometers. Via the exit of the self-cleaning filter F2, the water comes to the control-device CBV, here carried out as a butterfly valve, the opening of which being controlled by means of a motor M. The control-device CBV is connected to an ultrafilter UF, provided with membrane material, having pores of the size of 5–50 nanometers, passing only ions and small molecules and retaining undissolved matter including colloids, bacteria and viruses.

In order to minimize the pollution of the ultrafilter UF, the water is passed through the filter at such a high speed that the flow is turbulent, at the membrane only a thin laminar layer being present. This high speed can be obtained by feeding back part of the concentrate via a pump C1 to the entrance of the ultrafilter UF and draining away the remainder by way of a control flow rate controller CFR1.

The quantity of concentrate Q1 of the ultrafilter UF is thus kept constant and as the output Q2 has to be constant, the supply of polluted water Qo is also constant.

Nevertheless a certain degree of pollution will take place, as a result of which the output of the permeate slows down, so that the requirements of a constant output could no longer be met, the resistance of the ultrafilter UF increasing. In order to avoid this, the pressure at the exit of the ultrafilter UF is measured by means of a pressure switch PS, which upon going below the minimum pressure switches on the motor M, enlarging the opening of the control-device CBV as a result of which the pressure at the exit of the ultrafilter UF increases, the pressure switch PS switches off the motor M again and the control device CBV remains in its new position until in course of time the resistance of the ultrafilter has increased to such an extent that the pressure switch PS switches on the motor M again and the cycle is repeated.

The working pressure of the ultrafilter UF amounts to 500 to 1500 KPa. This pressure is too small for good functioning of the hyperfilter HF. The permeate is now supplied via one or more series arranged centrifugal pumps C2, increasing the pressure till 2000–2500 KPa and a constant flow rate controller CFR2 to the hyperfilter HF, said filter retaining the toxic contaminants such as heavy metals, phenolics, haloforms, pesticides, chemical weapons and radioactive compounds and draining them away by way of the constant flow rate controller CFR3 indicated by Q3. Finally the permeate goes to an active carbon filter ACF, in which highly toxic compounds passed by the hyperfilter HF removing 60-99.9% of the dissolved contaminants are adsorbed. At the exit of the active carbon filter ACF the purified potable water indicated by Q4 is now available. In order to avoid secondary bacteriological infection during storage, transport and distribution, some chlorine may be added.

To obtain the desired output of purified water Q4, the constant flow rate controllers CFR2 and CFR3 at the entrance and the exit, respectively, of the hyperfilter HF are adjusted such, that the difference between the quantity of water Q2 to be purified and the quantity of concentrate Q3 equals the desired quantity of permeate Q4.

As a result of the increase of the concentration of salts in the concentrate of the hyperfilter HF, which are difficult to dissolve, such as those of e.g. calcium and magnesium, they would precipitate on the material of the filter and disturb the action of the hyperfilter HF when the solution-product hereof would be exceeded. This is avoided by adding one or more chemicals preventing this precipitation, as e.g. poly-phosphates.

Figure 2:
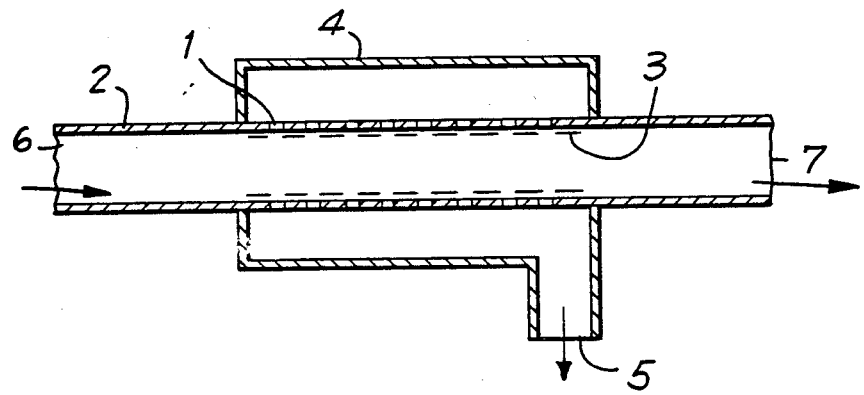
FIG.2 shows a cross-section of an ultrafilter element.

The ultrafilter UF consists of one or more parallel arranged elements, constructed as shown in FIG. 2. Each element consists of an inner tube 2 provided with small holes 1 in its wall. Against the inner wall of the inner tube 2, the membrane 3 is fixed. The water to be purified is forced through the inner tube 2, its speed being increased so much, that in each cross-section the flow is turbulent with only a thin laminar layer on the membrane, thus counteracting contamination.

The dirt particles are retained by the membrane 3, whereas the water freed of dirt flows through the small holes 1 of the inner tube 2, being collected in the outer tube 4 and drained away through an opening 5.

As is indicated before, the resistance of the membrane 3 still increases in the long run and care has to be taken that the pressure at the entrance of the inner tube 2 is sufficiently high in order to obtain a constant output of permeate at the exit 5.

I claim:

1. A device for making potable water out of water that may be contaminated by chemical, biological and nuclear polutants, as well as by pathogenic bacteria, viruses and normal solid particles, said device comprising:

(a) a perforated plate first filter for filtering out coarse pollutants,
(b) a finer second filter connected to the first filter for retaining finer particles,
(c) a third ultrafilter coupled to the second filter for removing the remainder of the undissolved materials, including colloids, bacteria and viruses,
(d) a fourth hyperfilter coupled to the third filter and through which the water is forced against osmotic pressure and in which the greater part of the dissolved materials, including heavy metals, phenolics, haloforms, pesticides and radioactive compounds remains behind,
(e) an activated carbon fifth filter for removing the remainder of any highly toxic chemicals,
(f) said third ultrafilter and fourth hyperfilter being directly coupled without interposition of a buffer tank,
(g) a control device provided at the entrance to the third ultrafilter,
(h) a pressure switch at the third ultrafilter's exit,
(i) and means connecting the pressure switch to said control device for keeping the pressure at the exit of the third ultrafilter approximately constant.

2. A device as claimed in claim 1 wherein the control device comprises a motor regulated valve, said motor being switched on by the pressure switch upon the pressure at the exit of the third ultrafilter reaching the lowest level desired causing the motor to further open the valve until the pressure switch switches off the motor again.

3. A device according to claim 1 or claim 2, wherein said third ultrafilter comprises one or more parallel arranged inner tubes, provided with holes in their walls, a membrane fixed against the inner side of the inner tubes, and an outer tube around each of the inner tubes for collecting the permeate.

4. A device as claimed in claim 1, further comprising a pump connected to the third ultrafilter for feeding back part of the concentrate to the entrance of the third ultrafilter at such a high speed that the flow is turbulent.

5. A device as claimed in claim 1 wherein the second filter passes only particles smaller than 90 micrometers, and the third ultrafilter has pores in the range of 5-50 nanometers.

6. A device as claimed in claim 1, and further comprising a pump connected in series between the third ultrafilter and the fourth hyperfilter for increasing the pressure at the hyperfilter.

* * * * *